Figure 1:
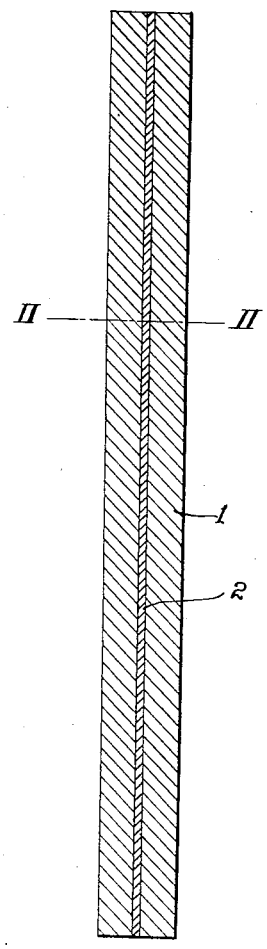

July 15, 1924.

P. H. BRACE 1,501,266

ARC WELDING ELECTRODE

Filed Aug. 17, 1920

WITNESSES:
H. J. Shelhamer
H. C. Bierman

INVENTOR
Porter H. Brace
BY
Chesley G. Carr
ATTORNEY

Patented July 15, 1924.

1,501,266

UNITED STATES PATENT OFFICE.

PORTER H. BRACE, OF WILKINSBURG, PENNSYLVANIA, ASSIGNOR TO WESTINGHOUSE ELECTRIC & MANUFACTURING COMPANY, A CORPORATION OF PENNSYLVANIA.

ARC-WELDING ELECTRODE.

Application filed August 17, 1920. Serial No. 404,088.

*To all whom it may concern:*

Be it known that I, PORTER H. BRACE, a citizen of the United States, and a resident of Wilkinsburg, in the county of Allegheny and State of Pennsylvania, have invented a new and useful Improvement in Arc-Welding Electrodes, of which the following is a specification.

This invention relates to arc welding electrodes, and it has for its object to provide an electrode that is capable of producing a weld which is uniform and ductile in order to prevent, in a large degree, the formation of oxides and nitrides in the weld, which tend to weaken the same.

I have found that welds made by the metallic electrode arc welding process are frequently deficient in ductility which I believe to be due to the presence of oxides and nitrides formed during the welding process. My present invention is designed to prevent the formation of oxides and nitrides of the welding metal and to destroy any such oxides and nitrides already present by the addition of one or more elements which have greater affinity for oxygen and nitrogen than has the welding metal. In order that the products of the reaction may not be included in the deposited metal, it is desirable that they have a fusing point lower than that of the welding metal itself.

It is well known that the melting point of an oxide is frequently lowered by the addition of another oxide, especially if one oxide is basic in character and the other acid. In a similar manner, it is probable that analogous basic and acid nitrides are formed which act similarly, and I utilize such phenomenon in my invention.

In carrying the objects of my invention into effect, I form an electrode of welding material, such as iron, and incorporate therein one or more substances which have an affinity for oxygen or nitrogen or both. I usually incorporate at least two elements preferably having a stronger affinity for oxygen and nitrogen than has the welding metal itself; one of these elements is capable of forming a basic oxide and another an acid oxide. I term such elements "reducing elements".

In embodying the subject-matter of my invention in practical form, I form a hollow electrode composed principally of the welding metal and alloy therewith one or more reducing elements capable of forming either basic or acid oxides or both, and fill the bore of the electrode with a reducing element capable of forming either acid or basic oxides or both. The method of incorporation of the reducing elements will vary with their character, but they should, in general, be either alloyed with the welding metal or enclosed in a gas-tight sheath of the same.

A number of elements are adapted for use in my new electrode, among which are the following which are capable of forming basic oxides: calcium, strontium, barium, cerium, magnesium, berylium, aluminum and manganese. Among the acid oxide-forming elements are the following: titanium, boron, silicon, vanadium, tantalum, zirconium and uranium. The above reducing elements and others of similar character are used in relatively small proportions and usually the total amount of added elements will not exceed 5%.

Figure 2:

Referring to the accompanying drawings forming a part hereof, and in which similar reference characters denote similar parts, Figure 1 is a longitudinal cross-section of an electrode constructed in accordance with my invention and Fig. 2 is a transverse cross-section on line 2—2 of Fig. 1.

The body 1 of the electrode is composed of any suitable welding metal, usually iron, and is alloyed with one or more of the elements above named or their equivalents. The core 2 may consist of one or more of the same elements. As a specific example of a composition which I have found suitable for the purpose, the body 1 is composed of an alloy of substantially pure iron containing approximately 1% of metallic titanium and approximately 2% of manganese, the core 2 being composed of metallic calcium. The ratio of the diameter of the body to the core is generally 20 to 1. The electrode is rolled into rods suitable for use in arc welding operations.

I have found that the metallic calcium in the above illustration stabilizes the arc and produces a ductile deposit. The manganese and titanium, by forming compounds having relatively low fusing points, assist in removing oxides and nitrides and produce a weld with an extremely fine grain.

Although I have described specifically an electrode of an iron alloy with a core of calcium, it is to be understood that this example is merely illustrative of my invention and does not define the scope thereof. It is obvious that many materials, some of which are set forth in this specification, are suitable for use in producing electrodes in accordance with the present invention and I claim the invention broadly except as limited by the claims appended hereto.

Having thus fully described my said invention, what I claim as new and desire to secure by Letters Patent is:—

1. An arc welding electrode comprising a welding metal and a plurality of types of reducing elements incorporated therein.

2. An arc welding electrode comprising a welding metal and a plurality of types of reducing elements having an affinity for oxygen and nitrogen incorporated therein.

3. An arc welding electrode comprising a welding metal and a plurality of types of reducing elements incorporated therein, said elements being capable of forming compounds during the welding operation having a relatively low fusing point 4. An arc welding electrode comprising a welding metal and at least one reducing element having an affinity for oxygen and nitrogen incorporated therein and capable of forming acid oxides, and at least one reducing element having an affinity for oxygen and nitrogen and capable of forming basic oxides.

5. An arc welding electrode comprising a welding metal and a plurality of types of reducing elements incorporated therein having a greater affinity for oxygen and nitrogen than the welding metal itself.

6. An arc welding electrode comprising a welding metal and a reducing element incorporated therein having an affinity for oxygen and nitrogen and capable of forming an acid oxide, and a core of a reducing element having an affinity for oxygen and nitrogen and capable of forming a basic oxide.

7. An arc welding electrode comprising a welding metal and a reducing element incorporated therein having an affinity for oxygen and nitrogen and capable of forming a basic oxide, and a core of a reducing element having an affinity for oxygen and nitrogen and capable of forming an acid oxide.

8. An arc welding electrode comprising a welding metal, reducing elements having an affinity for oxygen and nitrogen and capable of forming both acid and basic oxides incorporated therein, and a core of reducing elements also having an affinity for oxygen and nitrogen and capable of forming both acid and basic oxides.

9. An arc welding electrode comprising a welding metal and a plurality of types of reducing elements incorporated therein, said reducing elements comprising less than 5% of the electrode.

10. An arc welding electrode comprising a hollow electrode of iron containing a small amount of titanium and manganese, and having a core of metallic calcium.

11. An arc welding electrode comprising a hollow electrode of iron containing a small amount of titanium and having a core of metallic calcium.

In testimony whereof, I have hereunto subscribed my name this 11th day of August, 1920.

PORTER H. BRACE.